(12) United States Patent
Walling

(10) Patent No.: US 9,506,818 B2
(45) Date of Patent: Nov. 29, 2016

(54) RESISTOR AND A METHOD OF MANUFACTURING A RESISTOR CAPABLE OF OPERATING AT HIGH TEMPERATURES

(75) Inventor: Paul Walling, Hampshire (GB)

(73) Assignee: Weston Aerospace Limited (GB)

( * ) Notice: Subject to any disclaimer, the term of this patent is extended or adjusted under 35 U.S.C. 154(b) by 427 days.

(21) Appl. No.: 13/562,495

(22) Filed: Jul. 31, 2012

(65) Prior Publication Data

US 2013/0243035 A1 Sep. 19, 2013

(30) Foreign Application Priority Data

Aug. 1, 2011 (GB) .................................. 1113273.5

(51) Int. Cl.
| | | |
|---|---|---|
| *G01K 7/00* | (2006.01) | |
| *G01K 13/00* | (2006.01) | |
| *G01K 7/02* | (2006.01) | |
| *G01K 13/02* | (2006.01) | |

(52) U.S. Cl.
CPC .................. *G01K 7/02* (2013.01); *G01K 7/021* (2013.01); *G01K 13/02* (2013.01); *G01K 2013/024* (2013.01); *Y10T 29/49085* (2015.01)

(58) Field of Classification Search
USPC .................................. 374/179, 144, 183, 142
See application file for complete search history.

(56) References Cited

U.S. PATENT DOCUMENTS

| | | | | |
|---|---|---|---|---|
| 3,267,733 A | * | 8/1966 | Chambers | ........................ 338/28 |
| 3,609,545 A | * | 9/1971 | Engelhard | ..................... 324/156 |
| 3,934,333 A | | 1/1976 | Churchill | |
| 4,018,624 A | | 4/1977 | Rizzolo | |
| 4,586,020 A | * | 4/1986 | Naruo et al. | .................. 338/238 |
| 4,626,665 A | * | 12/1986 | Fort, III | ........................ 219/534 |
| 4,627,744 A | * | 12/1986 | Brixy | ........................ G01K 7/30 126/232 |
| 4,689,443 A | * | 8/1987 | Bailleul | .................... 174/102 P |
| 5,014,553 A | * | 5/1991 | Hori | ........................ G01N 25/00 338/24 |
| 5,144,279 A | * | 9/1992 | Yajima et al. | ................. 338/270 |
| 8,545,097 B2 | * | 10/2013 | Bachmann | ............ F01D 21/003 374/163 |
| 2002/0075126 A1 | * | 6/2002 | Reitz | ..................... B82Y 30/00 338/21 |
| 2006/0088075 A1 | * | 4/2006 | Ruffino | .................... G01K 7/42 374/100 |
| 2009/0141772 A1 | * | 6/2009 | Robinson | ...................... 374/179 |
| 2012/0076170 A1 | * | 3/2012 | Lee | .......................... G01K 7/02 374/179 |

FOREIGN PATENT DOCUMENTS

| | | |
|---|---|---|
| EP | 2023106 A2 | 2/2009 |
| FR | 2252674 A | 6/1975 |
| GB | 970247 A | 9/1964 |
| GB | 1090963 A | 11/1967 |
| GB | 1470564 A | 4/1977 |
| GB | 1518833 A | 7/1978 |
| GB | 2344892 A | 6/2000 |
| GB | 2451693 A | 2/2009 |

OTHER PUBLICATIONS

Search Report dated Dec. 12, 2011 for related Application GB1113273.5.

* cited by examiner

*Primary Examiner* — Mirellys Jagan

(74) *Attorney, Agent, or Firm* — Fredrikson & Byron, P.A.

(57) ABSTRACT

The invention provides a thermocouple assembly for use with a thermocouple harness in a gas turbine engine, comprising a thermocouple connected to a resistor, the resistor comprising a conductor, a mineral insulating material surrounding the conductor, and a metal sheath surrounding the conductor.

20 Claims, 3 Drawing Sheets

RESISTOR AND A METHOD OF MANUFACTURING A RESISTOR CAPABLE OF OPERATING AT HIGH TEMPERATURES

FIELD OF THE INVENTION

The present invention relates to a resistor that can operate at high temperature. In particular the present invention relates to a ballast resistor in a thermocouple assembly.

BACKGROUND OF THE INVENTION

Thermocouples are used to measure temperature and are often used in harsh environments such as gas turbine engines. Thermocouples typically comprise two wires of different metal, joined at their ends to form a loop. A temperature difference between the joined ends causes a current to flow around the loop, or a potential difference to be created. The difference in temperature between the two ends (the hot and cold ends) can be determined by measuring the potential difference set up when the circuit is open. If the temperature of the cold end is known, then the temperature of the hot end can be determined.

Several thermocouple units can be joined together to provide an average temperature measurement. In a gas turbine engine, for example, there may be eight or more thermocouple units coupled together in parallel.

A thermocouple unit consists of one, two or more thermocouple elements. The measuring end of each thermocouple is placed at the location at which temperature is to be measured while the other end (typically the cold end) is placed inside a thermocouple head and connected to a measuring circuit.

In order to provide improved system accuracy, an additional resistor, typically made from thermocouple material can be coupled to each thermocouple. This ensures that the thermocouple unit has a much higher resistance value when compared to the thermocouple harness that is used to connect thermocouple units together. This added resistor, called a ballast resistor, is manufactured using thermocouple alloys to ensure that the functionality of the thermocouple is not compromised.

FIG. 1 is a cross-section of a typical thermocouple unit 10 comprising a thermocouple head 12 in which a ballast resistor 14, is included. The thermocouple unit comprises thermocouple elements 16 connected to a ballast resistor 14 and to external circuitry through an output 18. A filling medium 20 is provided inside the thermocouple head to ensure that the wires within the thermocouple head are not damaged by vibration.

FIG. 2 is a circuit diagram of a typical K Type thermocouple, showing the ballast resistor 14 connected to one leg of the thermocouple 16. The K Type thermocouple shown in FIG. 2 comprises an NiAl leg 22 and a NiCr leg 24, with the ballast resistor 14 connected to the NiCr leg. The ballast resistor 14 is typically in the form of a sleeved wire that is wound into a coil, as shown in FIG. 1. Typically the resistor has a resistance of between 7 and 14Ω.

However, in order to improve the thermal efficiency of gas turbine engines, the operating temperatures of gas turbines are increasing. This increase in temperature means that the sensors in the engine have to survive in more extreme temperature conditions. Previous designs of thermocouple units, of the type illustrated in FIG. 1, have been designed to work with a head operating temperature below 400° C. However there is now a requirement to provide a thermocouple unit that is able to operate with head temperatures in excess of 470° C. It is an object of the present invention to provide a resistor and thermocouple unit that is able to operate at high temperatures.

EP2023106A discloses a thermocouple head unit including a pair of thermocouples in which the thermocouples are matched to have the same resistance. One of the thermocouples may be made longer, and coiled to fit within the casing, in order to match the resistance of the other. The thermocouples are mineral insulated and protected by a metal sheath.

Mineral insulated wire has also been used to form resistance heaters. For example, GB1518833A, U.S. Pat. No. 3,934,333 and FR2252674A disclose heater elements formed from mineral insulated wires.

SUMMARY OF EMBODIMENTS OF THE INVENTION

The present invention is defined in the attached independent claims, to which reference should now be made. Preferred features may be found in the dependent claims.

In a first aspect the invention provides a thermocouple assembly comprising a thermocouple connected to a resistor, the resistor comprising a conductor, a mineral insulating material surrounding the conductor, and a metal sheath surrounding the conductor.

Preferably, the conductor has an input end adapted for connection to external electrical components and an intermediate section, wherein at least a portion of the intermediate section has a smaller cross-section than the input end. The conductor may also have an output end, remote from the input end, wherein the portion of the intermediate section has a smaller cross-section than the output end.

The smaller cross-section of the intermediate section provides a higher electrical resistance, allowing a significant resistance value to be obtained for the resistor within a relatively low resistor volume.

The portion of the intermediate section having a smaller cross-section than the input end may be formed by swaging a mineral insulated cable of uniform cross-section. Either one or both ends of the cable may be left un-swaged to leave thicker conductors for connection to external components or in order to join a plurality of adjacent conductor portions within the sheath together in series. Other processes to reduce the cross-section of an intermediate section may be used, such as drawing.

Preferably, the conductor comprises a plurality of conductor portions extending side-by-side within the sheath, the plurality of conductor portions connected to each other in series. Mineral insulated cable can be formed with a plurality of parallel conductors extending through the sheath side-by-side. By connecting parallel conductor portions together in series the electrical path length through the cable is increased. The greater the number of conductor portions, the longer the overall length of the conductive path within the resistor and hence the higher the resistance of the resistor for a given length of sheath. So in the simplest case, the conductor may comprise two portions extending side-by-side within the sheath and connected in series. But in some embodiments, the conductor may comprise more than two conductor portions extending side by side within the sheath, connected to one another in series.

The conductor sections may be connected to one another by any suitable process, such as welding, brazing, silver soldering or crimping Any exposed portions of conductor i.e. portions uncovered by the mineral insulation material and sheath, may be insulated using another material, such as ceramic cement. Alternatively, the exposed portions may be covered by welding the sheath to itself. Exposed portions of conductor may be at one or both ends of the resistor where conductor sections are connected to each other.

Alternatively, or in addition, the conductor may comprise one or more coiled or tortuous portions. Coiled or tortuous portions of conductor increase the overall length of the conductor within a given length of sheath and so increase the electrical resistance of the resistor.

The materials used for the conductor can be chosen to suit the application. When for use as a ballast resistor in a thermocouple assembly, for example the conductor is preferably formed from the same material as one of the legs of the thermocouple, and more preferably the same material as the leg of the thermocouple to which it is connected. Preferably, the conductor is formed from the same material as the leg of the thermocouple having the higher electrical resistivity.

The conductor may be formed from a single material or may include portions made from different materials. For example, the conductor may have one half formed from a material having a positive temperature coefficient of electrical resistivity i.e. a material that has an increasing electrical resistance with increasing temperature, and the other half formed from a material having a negative temperature coefficient of electrical resistivity. In this way, the resistor may be formed such that it has the same total electrical resistance value throughout the range of temperatures in which it is designed to operate, and no separate temperature compensation is required.

The thermocouple assembly may comprise a thermocouple head. The thermocouple head may comprise an outer housing. The outer housing may include a thermocouple aperture configured to receive one end of the thermocouple and one or more output apertures for receiving electrical connections to external circuitry. The sheath of the resistor may be brazed at one or more locations to the housing of the thermocouple head. This provides a significant advantage in terms of reliability when the thermocouple head is in a high vibration environment, such as a gas turbine engine. The resistor can be well secured to the thermocouple head, substantially reducing the risk of damage to the resistor and the risk of a short circuit.

The resistor may be bent or coiled in order to fit within a particular volume within the thermocouple head. The thermocouple head may be filled with a filling medium in order to secure the resistor and to protect the resistor and other components from vibration.

The thermocouple may comprise two legs, each leg formed of a different material, the two legs connected to each other at one end. The conductor of the resistor is preferably formed from the same material as the leg of the thermocouple to which it is connected. Preferably, the conductor is connected to the leg of the thermocouple having the higher resistivity. For example, with a K type thermocouple, with NiAl and NiCr legs, the conductor of the resistor is preferably formed from NiCr.

In a second aspect, the invention provides a method of forming thermocouple assembly comprising a thermocouple connected to a resistor formed from a mineral insulated cable, wherein the mineral insulated cable comprises a conductor, a layer of mineral insulation surrounding the conductor and a metallic sheath surrounding the mineral insulation, wherein the mineral insulated cable comprises a first end for connection to external electrical components and an intermediate section spaced from the first end, the method comprising reducing the cross-section of the intermediate section so as to increase the electrical resistance of the conductor in the intermediate section.

Preferably, the step of reducing the cross-section of the intermediate section comprising swaging or drawing the intermediate section.

The mineral insulated cable may comprise a plurality of conductors arranged side-by-side within the sheath and the method may further comprise joining the plurality of conductors to one another in series.

The mineral insulated cable may comprise a second end, remote from the first end, wherein the second end does not form part of the intermediate section and is not reduced in cross-section.

The first and second ends leave relatively large diameter conductors that can be easily connected to external electrical components or allow the conductors to be readily connected to one another, while the reduced cross-section intermediate portion provides for a relatively high electrical resistance.

The method may further comprise the step of bending or coiling the cable following the step of reducing the cross-section of the intermediate section.

DESCRIPTIONS OF THE DRAWINGS

Preferred embodiments of the invention will be described, by way of example only, with reference to the attached drawings, in which.

DETAILED DESCRIPTION OF EMBODIMENTS OF THE INVENTION

Figure 1:
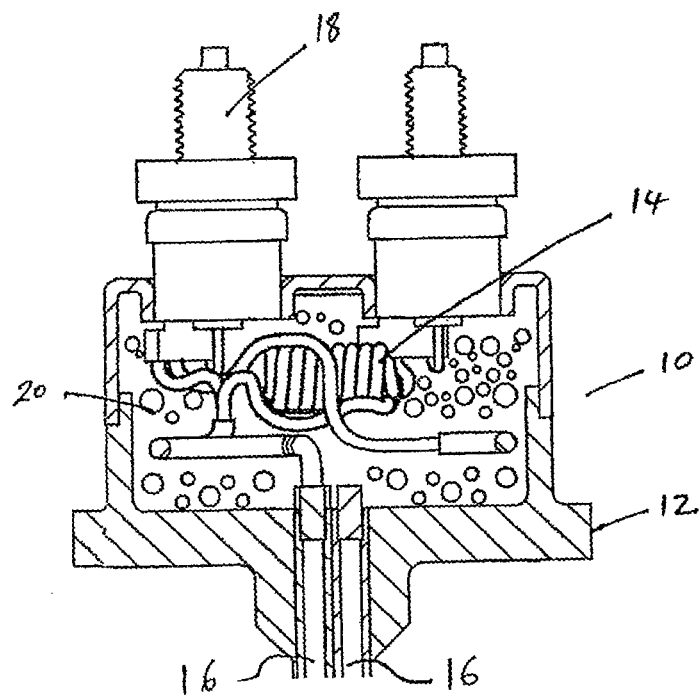
FIG. 1 is a cross-section of a thermocouple head including a ballast resistor.

FIG. 1 is a cross-section of a thermocouple unit 10 which includes a thermocouple head housing 12 within which there is a ballast resistor 14 connected to a thermocouple element 16. The resistor 14 is provided in order to increase the resistance of the thermocouple unit so that it is large relative to a harness that is used to connect thermocouple units together.

Figure 2:
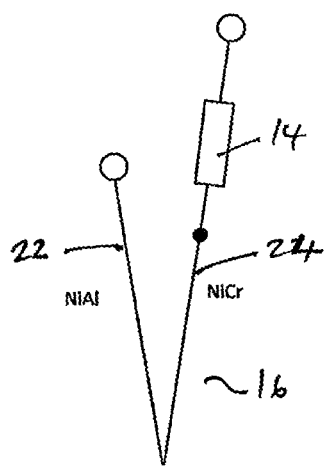
FIG. 2 is a schematic diagram showing the connection of a ballast resistor to a K Type thermocouple.

FIG. 2 shows how the ballast resistor is connected to the thermocouple element. In the example shown in FIG. 2, the thermocouple element is a K Type thermocouple having one leg formed of NiAl and the other leg formed of NiCr.

The present invention relates to the structure and formation of a ballast resistor that is able to withstand high temperatures, and there are various constructions that fall within the scope of the invention.

Figure 3:
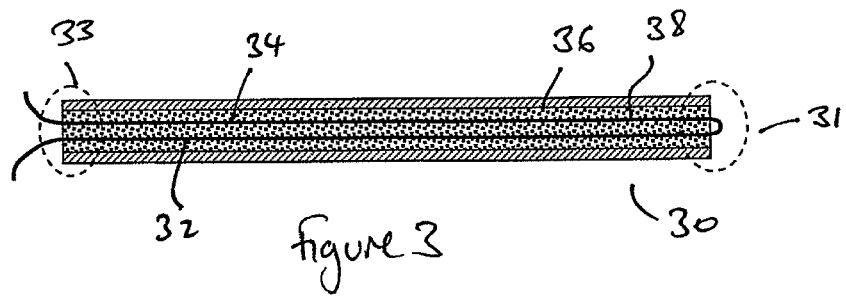
FIG. 3 is a schematic diagram of a resistor in accordance with a first embodiment of the invention.

FIG. 3 is a schematic illustration of a resistor in accordance with the present invention formed from a mineral insulated cable. This resistor 30 can be used as the ballast resistor in a thermocouple head of the type shown in FIG. 1. The mineral insulated cable of FIG. 3 comprises two conductor sections 32, 34 extending side-by-side within a metallic sheath 36 formed of stainless steel or a high temperature Nickel based alloy. The conductor sections 32, 34 are surrounded by a high temperature insulating material 38 such as magnesium oxide or silicon dioxide, within the sheath 36. In order to form a resistor, the two conductor sections 32, 34 are joined at one end 31, typically by welding. The end 31 at which the conductor sections are welded together may be protected by welding the end of the sheath 36 to itself or by covering the end 31 with ceramic cement. The end 33 may also be covered with ceramic cement for protection.

A resistor with this construction can operate at high temperature owing to the mineral insulation, and can be connected at an input end 33 to an electric circuit as required.

In order for the resistor shown in FIG. 3 to function within a thermocouple circuit, the conductor sections 32, 34 are formed from a thermocouple material matching the material of the thermocouple of the thermocouple circuit. In order to reduce the overall length of the resistor, the conductor sections are formed from the same material as the thermocouple leg that has the highest resistance per unit length. For a K Type thermocouple as illustrated in FIG. 2, this is the NiCr leg. The resistor 14 is added in series to the thermocouple leg that matches the material used for the ballast resistor, in this case the NiCr leg.

Figure 4:
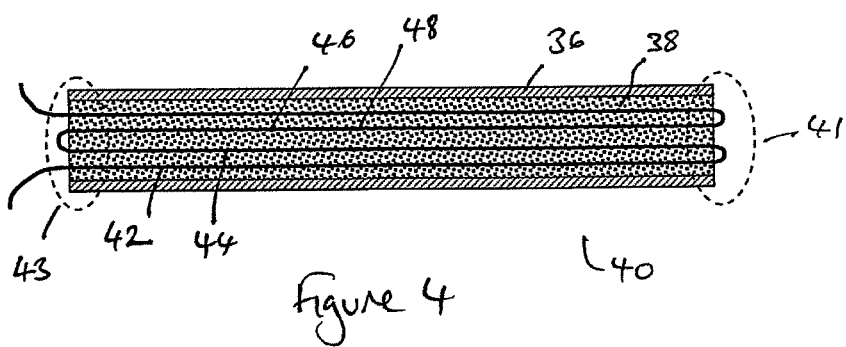
FIG. 4 illustrates a resistor in accordance with a second embodiment of the invention.

In order to reduce the size of the resistor while providing a given resistance, the length of the conductor within the sheath can be increased. FIG. 4 shows a resistor 40 formed from a mineral insulated cable including four conductor sections 42, 44, 46, 48. The conductor sections are joined together in series in the same manner as the conductor sections shown in FIG. 3. Again the exposed end 41 of the conductors may be covered by welding of the sheath over the ends or by protecting it with ceramic cement. The end 43 may also be covered with ceramic cement. The conductive path within the resistor shown in FIG. 4 is approximately twice as long as the path shown in FIG. 3 for a given length of sheath. Accordingly, the resistance of the resistor shown in FIG. 4 for a given length of sheath is approximately twice that of the resistor shown in FIG. 3.

Figure 5:
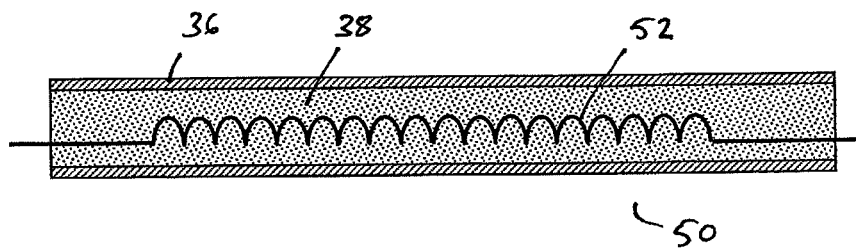
FIG. 5 illustrates a resistor in accordance with a third embodiment of the invention.

FIG. 5 shows an alternative option for increasing the length of the conductor within the resistor. In the resistor 50 of FIG. 5 the conductor 52 is coiled within the mineral insulation layer 38. This way of providing a longer length of conductor for a given length of sheath can be used in combination with the series connection of parallel conductor portions illustrated in FIGS. 3 and 4.

An additional way of increasing the resistance of the resistor is to reduce the cross-sectional area of the conductor within the resistor. FIGS. 6a to 6d illustrate how a resistor formed from mineral insulated cable can be swaged to reduce the cross-sectional area of the conductor and so increase the electrical resistance of the resistor.

Swaging is a well understood process that is used in the formation of mineral insulated cable. In the embodiments of the present invention shown in FIGS. 6b, 6c and 6d, a portion of a mineral insulated cable is further swaged to provide a reduced diameter portion. In this way a resistor with a desired resistance can be formed that can also be readily connected to other circuit components in an industrial process. The swaging process can be used with any of the resistor configurations shown in FIGS. 3, 4 and 5, or simply on a conventional mineral insulated cable.

Figure 6A:
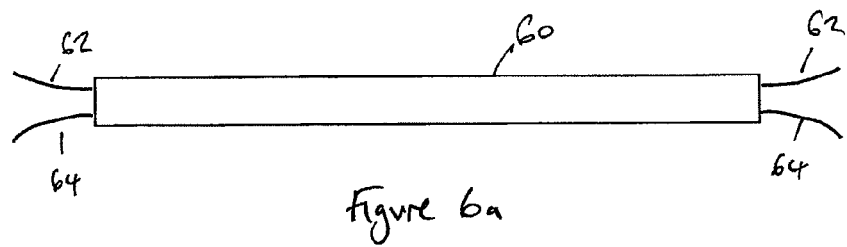
FIG. 6a is a schematic illustration of an un-swaged mineral insulated cable.

FIG. 6a is an illustration of a mineral insulated cable 60 before a further swaging process in accordance with the present invention, having uniform cross-section and including two conductor sections within the cable 60.

Figure 6B:
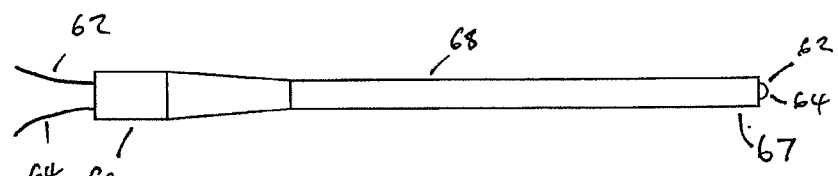
FIG. 6b is a schematic illustration of a resistor in accordance with the invention, including a swaged portion.

FIG. 6b shows the same cable after a further swaging process in accordance with the present invention. An input end 66 of the cable is left unswaged, leaving the conductors 62, 64 with connecting portions having the same, relatively large cross-section, typically 0.5 mm. This allows for relatively easy connection to a thermocouple circuit or other circuit. The majority of the length of the cable 60 is swaged to provide a reduced diameter portion 68. The conductors 62, 64 are joined at the end 67 remote from the input end 66. The unswaged mineral insulated cable has a typical diameter of 2.5 mm. After swaging, the swaged portion has a typical diameter of between 0.5 and 1 mm. The internal conductor portions then have a typical diameter of 0.1 mm in the swaged portion, dramatically increasing the resistance of those conductor portions.

Figure 6C:
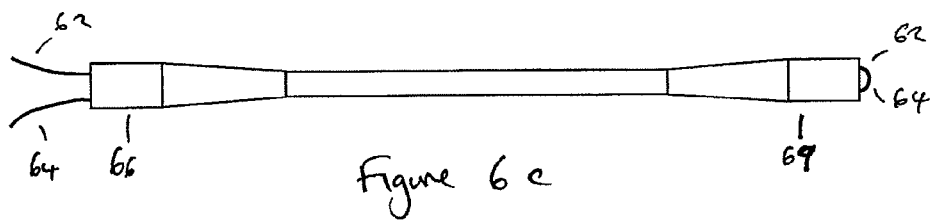
FIG. 6c is a schematic diagram of a resistor in accordance with invention made from a mineral insulated cable having un-swaged first and second ends and a swaged intermediate portion.

In the example shown in FIG. 6b, only one end of the mineral insulated cable is left unswaged and the small diameter conductors at the other end 67 are joined together using welding. However, to provide for an easier construction, in particular for providing easier joining of the conductors 62, 64 to one another at the end remote from the input end, a second end 69 of the mineral insulated cable may be left unswaged. This is illustrated in FIG. 6c. In the embodiment of FIG. 6c, only an intermediate portion, between the two ends 66, 69, has a reduced diameter. The larger conductors at the second end 69, typically having a diameter of 0.5 mm, can be more easily joined to one another in an industrial process than could the reduced diameter portions of the conductor.

The resistors illustrated in both FIGS. 6b and 6c can be bent or coiled. This allows the resistor to be formed into a shape suitable for insertion into a confined space, such as a thermocouple head illustrated in FIG. 1. Exposed portions of the conductor at the ends 67, 69 can be covered by welding the sheath to itself or by covering with another material, such as ceramic cement, as previously described. End 66 can be covered with ceramic cement, as previously described.

Figure 6D:
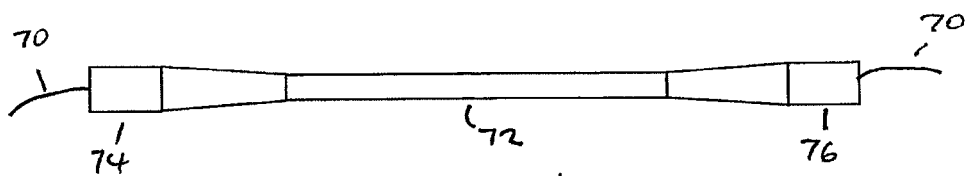
FIG. 6d is a schematic illustration of an alternative resistor in accordance with the invention having un-swaged first and second ends and a swaged intermediate portion.

FIG. 6d illustrates a further embodiment of a resistor in accordance with the invention, in which only a single conductor 70 extends through the mineral insulated cable construction. The single conductor 70 may be of the coiled or bent form illustrated in FIG. 5. In this case, an input end 74 and an output end 76 are left unswaged to allow for easy connection to external electrical components while a central or intermediate portion 72 of the resistor is swaged to reduce the diameter of the conductor 70 and hence increase its electrical resistance. Ends 74 and 76 can be covered with ceramic cement for protection.

Again, the resistor shown in FIG. 6d may be coiled or bent to provide a particular overall shape as desired.

Once the resistor has been formed into the desired shape, the metal sheath 36 may be brazed to its final position. This is particularly advantageous for use in a thermocouple head installed in harsh, high vibration environment. Brazing of the resistor into position will improve reliability as it will ensure that no movement or wear occurs within the thermocouple head. This also eliminates the risk of a short circuit to a metallic thermocouple head housing.

The invention claimed is:

1. A thermocouple assembly for use with a thermocouple harness in a gas turbine engine, comprising: a thermocouple connected to a resistor, the resistor being formed from a mineral insulated cable comprising a conductor, a mineral insulating material surrounding the conductor, and a metal sheath surrounding the mineral insulating material, wherein the conductor is electrically connected to the thermocouple, and the sheath is electrically insulated from the conductor.

2. A thermocouple assembly according to claim 1, wherein the conductor includes one or more coiled or tortuous portions.

3. A thermocouple assembly according to claim 1, wherein the conductor is formed from a single material.

4. A thermocouple assembly according to claim 1, comprising an outer housing, wherein the sheath of the resistor is brazed at one or more locations to the outer housing.

5. A thermocouple assembly according to claim 1, wherein the resistor is a ballast resistor formed of one or more thermocouple alloys and has resistance of between 7 and 14 ohms.

6. A thermocouple assembly according to claim 1, wherein the conductor has an input end adapted for connection to external electrical components and an intermediate section, wherein at least a portion of the intermediate section has a smaller cross-section than the input end.

7. A thermocouple assembly according to claim 6, further comprising an output end, remote from the input end, wherein the portion of the intermediate section has a smaller cross-section than the output end.

8. A thermocouple assembly according to claim 1, wherein the conductor comprises a plurality of conductor portions extending side-by-side within the sheath, the plurality of conductor portions connected to each other in series.

9. A thermocouple assembly according to claim 8, wherein the conductor comprises more than two conductor portions extending side-by-side within the sheath and connected to one another in series.

10. A thermocouple assembly according to claim 1, wherein the conductor comprises portions made from different materials.

11. A thermocouple assembly according to claim 10, wherein the conductor comprises a portion formed from a material having a positive temperature coefficient of electrical resistance and a portion formed from a material having a negative temperature coefficient or electrical resistance.

12. A thermocouple assembly according to claim 1, wherein the thermocouple comprises two legs, each leg formed of a different material, and wherein the conductor of the resistor comprises the same material as a leg of the thermocouple to which it is connected.

13. A thermocouple assembly according to claim 12, wherein the conductor is connected to the leg of the thermocouple having the higher resistivity.

14. A thermocouple assembly according to claim 1, wherein the resistor is a ballast resistor.

15. A thermocouple assembly according to claim 14, wherein the resistor increases resistance of the thermocouple, whereby the resistance is configured to be large relative to a thermocouple harness used in connecting the thermocouple together to one or more other thermocouples.

16. A thermocouple assembly according to claim 14, wherein the ballast resistor is formed of one or more thermocouple alloys.

17. A thermocouple assembly according to claim 14, wherein the ballast resistor has a resistance of between 7 and 14 ohms.

18. A method of forming a thermocouple assembly for use with a thermocouple harness in a gas turbine engine, comprising a thermocouple connected to a resistor, the resistor formed from a mineral insulated cable, wherein the mineral insulated cable comprises a conductor, a layer of mineral insulating material surrounding the conductor and a metallic sheath surrounding the mineral insulating material, wherein the mineral insulated cable comprises a first end for connection to external electrical components and an intermediate section spaced from the first end, the method comprising reducing the cross-section of the intermediate section so as to increase the electrical resistance of the conductor in the intermediate section, wherein the conductor is electrically connected to the thermocouple, and the sheath is electrically insulated from the conductor.

19. A method according to claim 18, wherein the mineral insulated cable comprises a plurality of conductors arranged side-by-side within the sheath, the method further comprising joining the plurality of conductors to one another in series.

20. A method according to claim 18, further comprising the step of bending or coiling the cable following the step of reducing the cross-section of the intermediate section.

* * * * *